United States Patent
Rajput et al.

(10) Patent No.: US 7,206,738 B2
(45) Date of Patent: Apr. 17, 2007

(54) HYBRID BASEFORM GENERATION

(75) Inventors: Nitendra Rajput, New Delhi (IN); Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 10/219,686

(22) Filed: Aug. 14, 2002

(65) Prior Publication Data

US 2004/0034524 A1 Feb. 19, 2004

(51) Int. Cl.
*G06F 17/21* (2006.01)
(52) U.S. Cl. .............................. 704/10; 704/9; 704/254
(58) Field of Classification Search .................... 704/9, 704/10, 254, 260
See application file for complete search history.

(56) References Cited

U.S. PATENT DOCUMENTS

| | | | | |
|---|---|---|---|---|
| 4,882,759 | A * | 11/1989 | Bahl et al. | 704/243 |
| 5,033,087 | A * | 7/1991 | Bahl et al. | 704/256.5 |
| 5,268,990 | A * | 12/1993 | Cohen et al. | 704/200 |
| 6,343,270 | B1 * | 1/2002 | Bahl et al. | 704/257 |
| 6,377,921 | B1 * | 4/2002 | Bahl et al. | 704/243 |
| 6,389,395 | B1 * | 5/2002 | Ringland | 704/254 |
| 6,928,404 | B1 * | 8/2005 | Gopalakrishnan et al. | 704/10 |
| 2002/0013707 | A1 * | 1/2002 | Shaw et al. | 704/257 |
| 2002/0152068 | A1 * | 10/2002 | Neti et al. | 704/236 |

OTHER PUBLICATIONS

A. Asadi, R. Schwartz, and J. Makhoul. 1991. Automatic modeling for adding new words to a large vocabulary speech recognition system. In Proceedings of International Conference on Acoustics, Speech and Signal Processing: ICASSP'91.

R. L. Bahl, S. Das, P. V. deSouza, M. Epstein, R. L. Mercer, B. Merialdo, D. Nahamoo, M. A. Picheny, and J. Powell. 1991. Automatic phonetic baseform determination. In Proceedings of International Conference on Acoustics, Speech and Signal Processing: ICASSP'91.

(Continued)

*Primary Examiner*—Richemond Dorvil
*Assistant Examiner*—Leonard Saint-Cyr
(74) *Attorney, Agent, or Firm*—Gibb I.P. Law Firm, LLC; T. Rao Coca, Esq.

(57) ABSTRACT

A method, a computer system and a computer program product for generating baseforms or phonetic spellings from input text are disclosed. The baseforms are initially generated using rules defined for a particular language. Then, phones are identified in the language that are exceptions to the defined rules and an action is associated with each identified phone. A statistical technique is applied to determine whether the identified phones can be modified. Finally, baseforms containing the identified phones that can be modified, are corrected according to the associated actions. Preferably, the statistical technique is only applied to baseforms containing phones that are exceptions to the defined rules. The defined rules can comprise spelling-to-sound rules for a particular phonetic language that incorporate all possible alternative pronunciations of each baseform.

29 Claims, 5 Drawing Sheets

OTHER PUBLICATIONS

N. Deshmukh, J. Ngan, J. Hamaker, and J. Picone. 1997. An advanced system to generate pronunciations of proper nouns. In Proceedings of International Conference on Acoustics, Speech and Signal Proceedings: ICASSP'97.

T. Holter, and T. Svendsen. 1996. A comparison of lexicon-building methods for subword-based speech recognisers. TENCON 1996.

B. Ramabhadran, L. R. Bahl, P. V. deSouza, and M. Padmanabhan. 1998. Acoustics-only based automatic phonetic baseform generation. In Proceedings of International Conference on Acoustics, Speech and Signal Processing: ICASSP'98, 309-312.

N. Rajput, L. V. Subramaniam and A. Verma. 2000. Adapting phonetic decision trees between languages for continuous speech recognition. In Proceedings of International Conference on Spoken Language Processing: ICSLP 2000.

* cited by examiner

HYBRID BASEFORM GENERATION

FIELD OF THE INVENTION

The present invention relates to the generation of baseforms for languages and more particularly to the generation of baseforms for phonetic languages.

BACKGROUND

Spelling-to-sound rules are used to build baseforms for phonetically-based languages. A baseform comprises the phonetic spelling of a word in a particular language. As described in a paper entitled: "*Automatic Modelling for Adding New Words to a Large Vocabulary Speech Recognition System*", by Asadi A., Schwartz R., and Makhoul J., published in the Proceedings of ICASSP'91, and a paper entitled: "*An Advanced System to Generate Pronunciations of Proper Nouns*", by Deshmukh, Neeraj, Ngan J., Hamaker J., and Picone J., published in the Proceedings of ICASSP'97, automated baseform generation/building is of considerable importance in numerous applications.

In speech recognition applications, automated baseform generation is used to build phonetic spellings for user-specific words. To elaborate, in dictation applications, if a user requires words that are not contained in the dictionary of the dictation task, the application provides mechanisms for automatically generating phonetic spellings from the given spelling of a new word or, alternatively, from the speech signal of that word. In speech synthesis applications, automatic baseform generators/builders are used to build pronunciations for words that do not exist in the vocabulary of the synthesis system. This is critical for a speech synthesis system, as the system needs to know the pronunciation of a word before the word can be synthesized.

According to Bahl et al., in "*Automatic Phonetic Baseform Determination*", Proceedings of ICASSP'91, for languages that do not have a strong relationship between spelling and pronunciation, attempts have been made to train a system from a large vocabulary whereby spelling-to-sound rules are learnt statistically. Disadvantageously, such systems require a large set of words and corresponding baseforms for training and may not perform well when presented with a sequence of letters substantially different to those used for training purposes. An example is the presentation of proper nouns (e.g. names).

Ramabhadran et al., in "*Acoustics-only based Automatic Phonetic Baseform Generation*", Proceedings of ICASSP'98, 309–312, and Holter et al., in "*A Comparison of Lexicon-Building Methods for Subword-Based Speech Recognisers*", Proceedings of TENCON '96, mention another approach whereby authors make use of the acoustics of a word whose baseform is to be determined. Disadvantageously, this would render the baseform speaker-dependent and possibly of limited or no use for other speakers.

For non-phonetically based languages, a system can be trained with speech in addition to spelling, thus enabling the system to interpret spelling-to-sound rules with the aid of speech. The use of speech can be avoided for phonetically-based languages. Instead, rule-based techniques for generating baseforms can be used that rely only on the spelling of words and do not require speech input. However, baseform generation that is solely rule-based tends to suffer from associated ambiguities. Such ambiguities are typically manifested as "unruly" phones, which are defined as prevalent pronunciations of phones that do not conform to defined rules for converting spelling to sound, and result in incorrect baseforms being generated.

SUMMARY

According to aspects of the present invention, there are provided a method, a computer system and a computer program product for generating baseforms or phonetic spellings from input text.

Baseforms are initially generated using rules defined for a particular language. Then, phones are identified in the language that are exceptions to the defined rules and an action is associated with each identified phone. A statistical technique is applied to determine whether the identified phones can be modified. Finally, baseforms containing the identified phones that can be modified, are corrected according to the associated actions.

Preferably, the statistical technique is only applied to baseforms containing phones that are exceptions to the defined rules. The defined rules can comprise spelling-to-sound rules for a particular phonetic language that incorporate all possible alternative pronunciations of each baseform.

Correction of baseforms containing phones that can be modified can comprise any one or more of removing a phone from a baseform, replacing a phone by another phone, and deleting a baseform.

A statistical technique can be applied to reduce the number of alternative baseforms to generate a reduced size pronunciation dictionary. Moreover, information relating to the context of a phone that is an exception to the defined rules can be used to reduce the size of a pronunciation dictionary. Reduction in size of a pronunciation dictionary occurs as all the redundant alternate baseforms of a single word will be removed by application of a statistical technique.

Computer system/s and computer program product/s are further described herein for embodying or implementing methods for generating baseforms or phonetic spellings from input text.

According to one particular aspect of the present invention, a computer program product is provided that includes a pronunciation dictionary for a particular language, a list of actions associated with phones that are exceptions to rules defined for the language, computer program code means for generating baseforms according to the defined rules, computer program code means for identifying phones in the baseforms that are exceptions to the defined rules, computer program code means for applying a statistical technique to determine whether the identified phones can be modified, and computer program code means for correcting baseforms containing the identified phones that can be modified according to the associated actions. Typically, the pronunciation dictionary and list of actions are stored as data in the computer program product.

BRIEF DESCRIPTION OF THE DRAWINGS

Features and preferred embodiments of the present invention are described hereinafter, by way of example only, with reference to the accompanying drawings in which.

DETAILED DESCRIPTION

A method, a computer system and a computer program product are described herein for generating baseforms from the spelling of input text. For ease of explanation, the preferred method, computer system and computer program product are described with specific reference to the Hindi language. However, it is not intended that the present invention be so limited as the principles thereof have general applicability to any phonetically-based language.

The method, computer system and computer program product described herein have application to speech synthesis and speech recognition systems. Accordingly, speech synthesis applications could provide a user with the capability of adding new words that may not be contained in the general vocabulary (pronunciation dictionary) of the original system. Specific examples include proper nouns such as names of places, people, etc. An example of a speech recognition application that could benefit from the method, computer system and computer program product described herein is a dictation application/system that works on a fixed vocabulary. In such a case, baseforms can be generated for new words that are required by a user in a dictation task. Building of applications over a speech recognition system (e.g. command browsing through speech) also requires pronunciations of new words introduced by the application developer, based on the needs of the specific application.

The method, computer system and computer program product described herein address the limitations of existing arrangements by way of a hybrid technique. Firstly, baseforms are generated using predefined rules and, subsequently, statistical techniques are applied to correct those of the generated baseforms that suffer from ambiguities.

Accordingly, a framework is provided for generating baseforms using both spelling-to-sound rules and subsequent statistical processing. The rule-based baseforms provide a corpus for training the described system. Further, such a hybrid baseform generator can be used to generate an "optimal" number of alternate pronunciations of particular baseforms.

Figure 1:
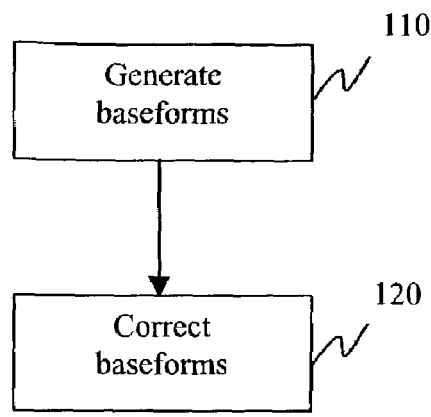
FIG. 1 is a flow diagram of a method for generating baseforms.

FIG. 1 shows a flow diagram of a method for generating baseforms. Baseforms are initially generated using the spelling of input text, based on predefined spelling-to-sound rules, at step 110. The baseforms are subsequently corrected, if necessary, at step 120. Baseform correction is performed to remove, replace or modify unruly phones using statistical techniques, examples of which are described hereinafter.

The method shown in FIG. 1 for generating baseforms has the advantage that a complete set of predefined spelling-to-sound rules can be exploited in the process of baseform generation. A further advantage is that statistical techniques are required only for those phones that cannot be covered by the spelling-to-sound rules. Separation of the spelling rules from the statistical technique results in a lesser amount of training data being necessary.

Rule-Based Baseform Generation

Specifying rules to build baseforms from the spelling of input text can be effective for a large number of words in a phonetic language. Knowledge of the set of phones, pronunciations of each phone, and linguistic knowledge of the language are all used to define rules for converting spellings to sounds. The rules provide mappings of characters to phones and all the characters can thus be simply represented in the phonetic space. Accordingly, a rule-based phonetizer can be provided for a phonetic language. A phonetizer is a general term that refers to a system for generating baseforms of words using any known technique, either from the spelling and/or the recorded utterance of the words.

The mappings are one-to-many, however, to generate alternative pronunciations. In Hindi, for example, parallel pronunciations exist for at least two main reasons:

Though the language has for each literal specific pronunciations that are not context-dependent, characters are often pronounced differently by different speakers. This phenomenon occurs primarily because Hindi has adopted various Arabic words, which are pronounced differently by different speakers.

Written Hindi often contains errors. For example, a pair of characters is often interchanged, thus leading to a variation in pronunciation.

To handle these statistically significant mispronunciations and/or misspellings, the rules are modified to generate parallel baseforms whenever such characters are encountered. Providing parallel baseforms in the spelling-to-sound rules creates an "over-saturated" vocabulary comprising more alternative baseforms than is normally necessary. Incorporating all the possibilities to generate parallel baseforms increases the vocabulary size, and hence the search time for decoding also increases. Better acoustic scores are expected, however, when the desired lexeme is present in the vocabulary as opposed to a scenario when only one baseform is available for each word (a lexeme refers to an alternate pronunciation of a word). Often the parallelism generated by the rule-based technique is not used, so the vocabulary size is unnecessarily large. However, spelling-to-sound rules are made on an all-inclusive basis. Moreover, the aim in generating baseforms for a word is that all possible baseforms for the word are generated. Here, parallelism is generated and initial over-saturation occurs.

A solution to over-saturation is to subsequently apply a statistical technique to reduce the number of redundant baseforms.

A further reason exists to apply a statistical technique. In certain languages, some sounds are not governed by a spelling-to-sound rule and statistical training can be used to correct the associated baseforms. The number of unruly phones (phones that cannot be generated correctly by the defined spelling-to-sound rules) in a phonetic language is relatively small and, consequently, the degree of training required is correspondingly small.

Training a Baseform Generator

Figure 2:
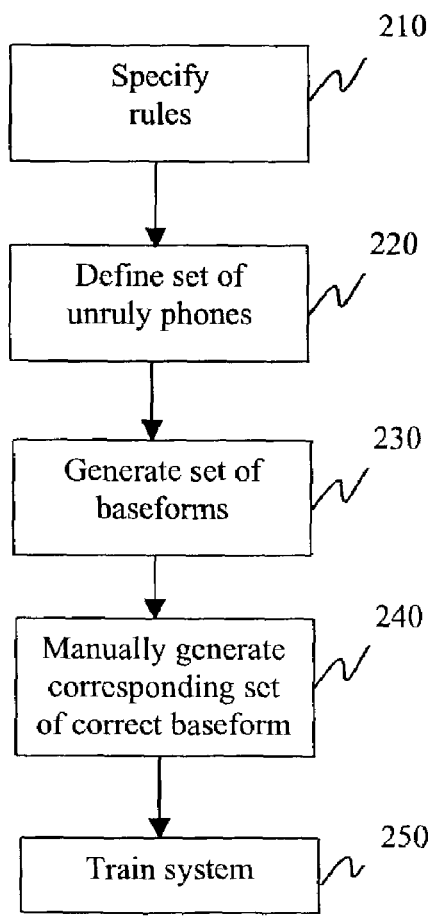
FIG. 2 is a flow diagram of a method for training a baseform generator.

FIG. 2 shows a flow diagram of a method for training a baseform generator. Firstly, spelling-to-sound rules, for a particular language, are defined at step 210.

At step 220, the set of "unruly" phones is defined. Unruly phones, when pronounced, do not conform to spelling-to-sound rules as defined in previous step 210. The effects of unruly phones on baseforms, in which the unruly phones occur, can also be determined. For Hindi, the unruly phones are AX, PH, F, JH and Z. An action, corresponding to each unruly phone, is defined to correct the baseform containing that unruly phone. A particular unruly phone can have only one of the following actions associated with the phone:

Removal of the phone from the baseform;
Replacement of the phone by another phone; or
Deletion of the baseform due to parallel redundancy.

Next, at step 230, a set of baseforms in respect of the unruly phones defined at step 220, is generated using the rules specified at step 210.

At step 240, a set of correct baseforms that correspond to the baseforms generated at step 230 are manually generated for use as training data. Since training data is required only for unruly phones, the manually generated set of baseforms required is of reduced size relative to other methods, systems and/or computer programs.

Finally, the baseforms containing unruly phones are used for statistical training of the baseform generator, at step 230. Training is performed using the two sets of baseforms generated at steps 230 and 240 for a particular set of words. One set results from rule-based baseform generation and the other set comprises correct versions of those baseforms. The set of correct baseforms has to be supplied to the system and is typically generated manually. During training, a determination is made of which alternative baseforms are redundant and which baseforms are to be modified. Since statistical training is required to modify or delete only a few phones in some baseforms, only a small amount of training data is required. Moreover, the context of an unruly phone in a baseform can be used to determine the correctness or existence of that particular phone in the baseform.

Statistical Baseform Modification

Consider a set of phones $G=\{P_1, P_2, \ldots P_N\}$ that has a subset of unruly phones $\Pi=\{P_{u1}, P_{u2}, \ldots P_{uK}\}$. Statistical techniques can be used to modify baseforms generated by rule-based techniques that have one or more unruly phones present in the baseforms.

Figure 3:
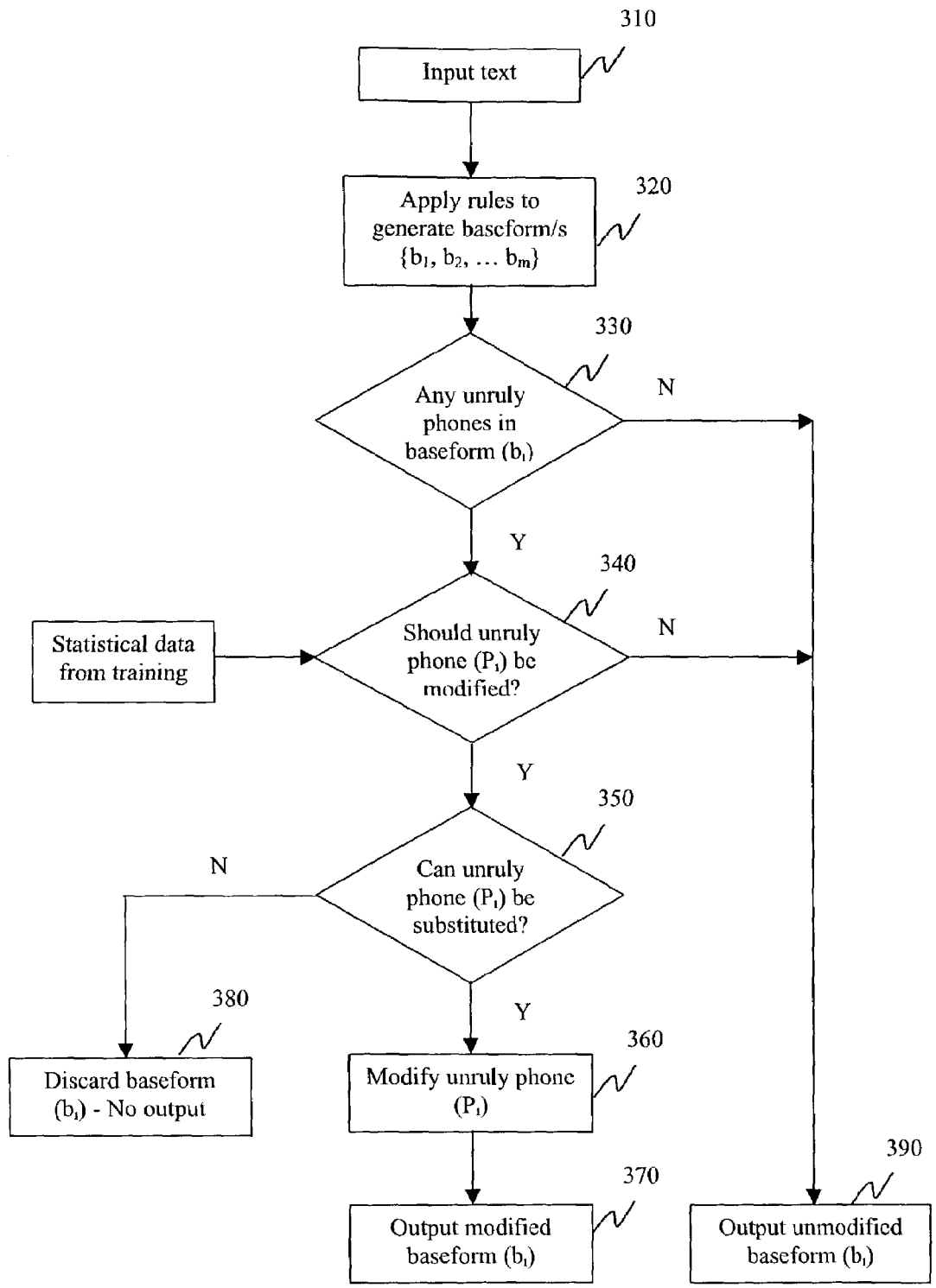
FIG. 3 is a flow diagram of a method for generating rule-based baseforms and modifying such baseforms using statistical techniques.

FIG. 3 shows a flow diagram of a method for generating rule-based baseforms and modifying such baseforms using statistical techniques.

Text in a phonetically-based language is input for baseform generation at step 310. At step 320, predefined rules are applied to the text to generate rule-based baseforms $\{b_1, b_2, \ldots, b_m\}$. For each rule-based baseform $b_i$, any unruly phones are identified at step 330. If none exist (N), the baseform $b_i$ is output without any modifications by the statistical system at step 390. For each unruly phone $P_{ui}$ (in the set of unruly phones $\Pi=\{P_{u1}, P_{u2}, \ldots P_{uK}\}$) identified (Y) at step 330, a determination is made whether the unruly phone $P_{ui}$ can be modified, at step 340. This determination is made based on training statistics, which can include statistical probabilities, decision trees and/or neural networks. If the statistical system decides that the unruly phone $P_{ui}$ in the given baseform $b_i$ should not be modified (N), at step 340, the unmodified baseform $b_i$ is output at step 390. If the statistical system decides that the unruly phone $P_{ui}$ in the baseform $b_i$ should be modified, at step 340, a lookup is performed to obtain the characteristics of the unruly phone $P_{ui}$, at step 350. If the characteristics of the unruly phone $P_{ui}$ show that the unruly phone $P_{ui}$ is not substitutable (N), baseform $b_i$ is discarded at step 380 and is thus not output. If the characteristics of the unruly phone $P_{ui}$ show that the unruly phone $P_{ui}$ is one to be substituted (Y), at step 350, the unruly phone $P_{ui}$ is modified at step 360 and a correspondingly modified baseform $b_i'$ is output at step 370.

The method of FIG. 3 uses information about the context of unruly phones when such appear in the baseform of a word generated by a rule-based technique, at step 340. Depending on the context and action associated with a particular unruly phone, either the baseform is not modified at all, or only the phone under consideration is modified in the baseform, or the baseform itself is discarded.

Figure 4:
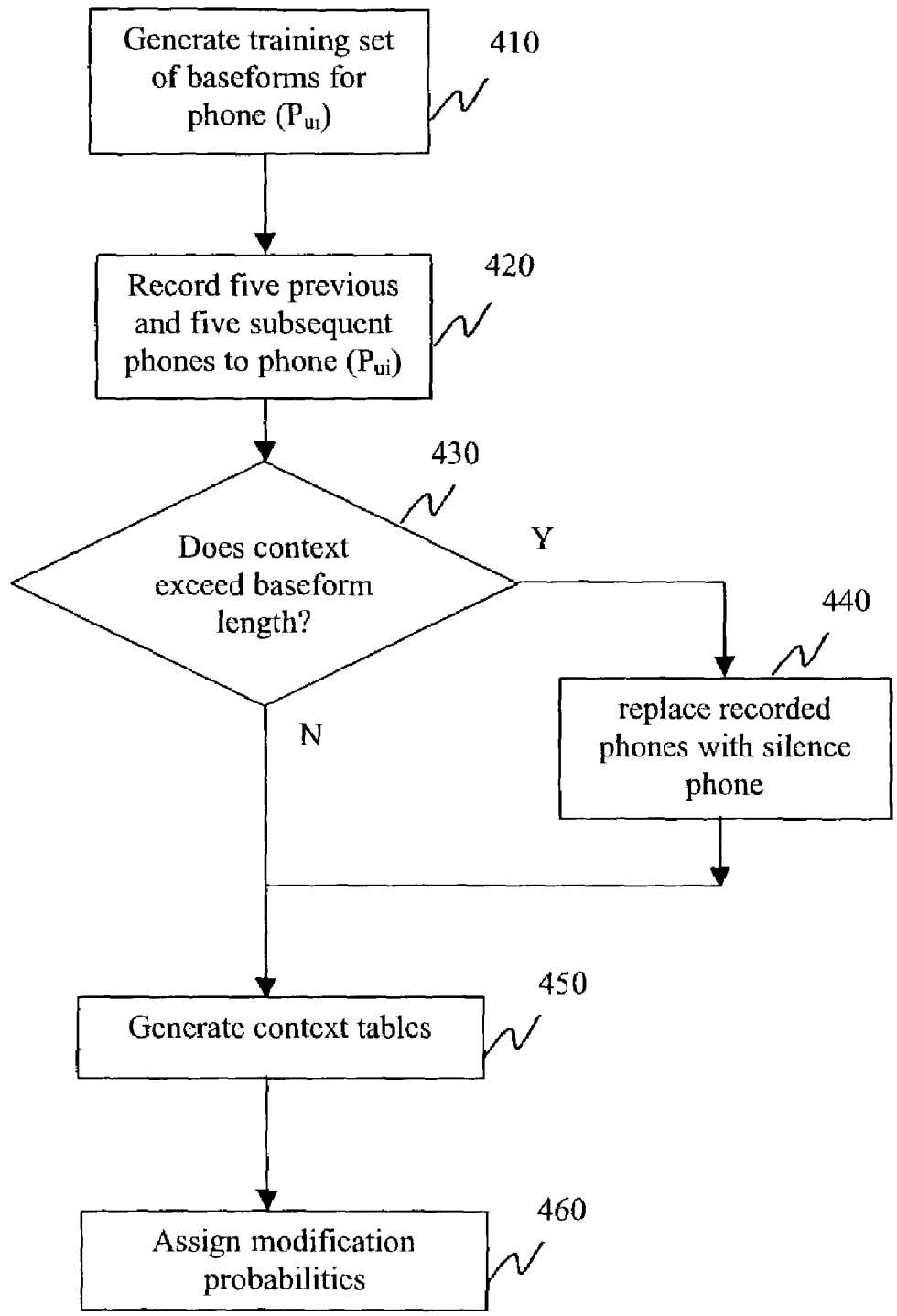
FIG. 4 is a flow diagram of a method for training a system for context-dependent baseform correction.

FIG. 4 shows a flow diagram of a method for training a system for context-dependent baseform correction, in accordance with the method shown in FIG. 3.

At step 410, a training set of baseforms is generated for each unruly phone $P_{ui}$ by manually correcting the baseforms in which the unruly phone $P_{ui}$ appears.

Then, at step 420, the five previous and five subsequent phones $\{P_{c-5}, P_{c-4}, P_{c-3}, P_{c-2}, P_{c-1}, P_{c1}, P_{c2}, P_{c3}, P_{c4}, P_{c5}\}$ of $P_{ui}$ ($P_c$) are recorded as the context of the unruly phone $P_{ui}$.

If the context exceeds the baseform length (Y), at step 430, the recorded phone/s are replaced with the silence phone X in the relevant position/s, at step 440, and the method continues at step 450. If the context does not exceed the baseform length (N), at step 430, the method continues directly at step 450.

Two sets of context tables are defined at step 450. One set corresponds to contexts wherein the phone $P_{ui}$ remains in the correct baseform, and the second set corresponds to contexts wherein the phone $P_{ui}$ is modified to correct the baseform.

Then, at step 460, modification probabilities are assigned to the phone set $G=\{P_1, P_2, \ldots P_N\}$ for each context location by counting the number of occurrences of the phones in the context tables.

Using the foregoing training method, as shown in FIG. 4, all the probabilities of modification for all contexts and for all the phones in the subset are calculated as follows:

$P_{kj}(m)$=probability (phone at context position $k$ is $P_j$), where:
$k=-5, -4, \ldots, 4, 5$; and
$j=1, 2, \ldots, 61$.

At the time of baseform modification, when a new baseform containing an unruly phone $P_{ui}$ is encountered, the training probabilities $p_{ui}$ are used to find the probability of modification of the phone given the complete context of phone $P_{ui}$ in the baseform using the weighted sum:

$$p(m) = \sum_{k=-5}^{5} w_k \sum_{j=1}^{61} \phi_j P_{kj}(m)$$

where:
$\phi_j=1$ when $P_j=P_{ck}$, else $\phi_j=0$,
$W_k$ is the weight at the context position k, and $$\sum_{k=-5}^{5} w_k = 1,$$

with a position nearer to the phone in question being given a higher weight.

If the calculated probability is higher than a selected threshold, the baseform is modified. If not, the baseform is left unchanged. As shown in FIG. 3, modifications can be of two types depending on the phone $P_{ui}$. Either the baseform itself is discarded, being judged as a redundant alternative baseform, or the phone $P_{ui}$ is modified to correct the baseform. This method of first generating baseforms using spelling-to-sound rules and then using the contexts in those baseforms to modify the baseforms has the advantage that training data is only needed for baseforms that contain phones that are members of the unruly set Π. Only a small amount of training data is thus required. Advantageously, the use of statistical training corrects most of the baseforms containing unruly phones.

Using Decision Trees for Baseform Modification

Counting the number of occurrences of phones in the contexts may not be the best way to estimate p(m). In Hindi, for example, there are 10 contexts and 61 phones that result in at least 610 different positions to look for in a context-based decision.

Decision trees can be used to determine the modifications necessary to baseforms containing unruly phones in the unruly set Π. A decision tree is generated for each phone in the unruly set Π. Generation of such decision trees involves asking questions of a set of training baseforms. The questions partition the set of baseforms at each node in the decision tree into the best possible context that would differentiate between modifiable and non-modifiable baseforms. For each phone $P_{ui}$ in the unruly set Π, the rule-based baseforms and correct corresponding baseforms that contain the phone $P_{ui}$, are obtained. The questions are selected at each node.

The best question at any particular node is the question that divides the data into two sets of equal size, which differ most in terms of baseforms that contain a phone to be modified and a phone not to be modified. An exemplary set of questions that can be used are described by Rajput N., Subramaniam L. V., and Verma A in "*Adapting Phonetic Decision Trees Between Languages for Continuous Speech Recognition*", Proceedings Of International Conference on Spoken Language Processing (ICSLP 2000). Each question is of the type: "Does the phone at position 3 belong to the subset P, PH, B, BH, M". All of the questions result in binary YES/NO answers and each node correspondingly has 2 children. The following score s can be used to determine the best question at any node in the tree:

$$s = \frac{|(m_y - m_N) - (u_y - u_N)|}{m_y + m_N + u_y + u_N}$$

where:

$m_y$ is the number of cases when a question results in a YES answer and the phone has to be modified;

$m_N$ is the number of cases when a question results in a NO answer and the phone has to be modified;

$u_y$ is the number of cases when a question results in a YES answer and the phone need not be modified; and $u_N$ is the number of cases when a question results in a NO answer and the phone need not be modified.

The resulting score s is maximized in the case when all the modifiable baseforms form one child ($m_N=0$) and all the unmodifiable baseforms form the other child ($u_y=0$) of the node. The question that results in the highest score is selected as the best question for a particular node.

Figure 5:
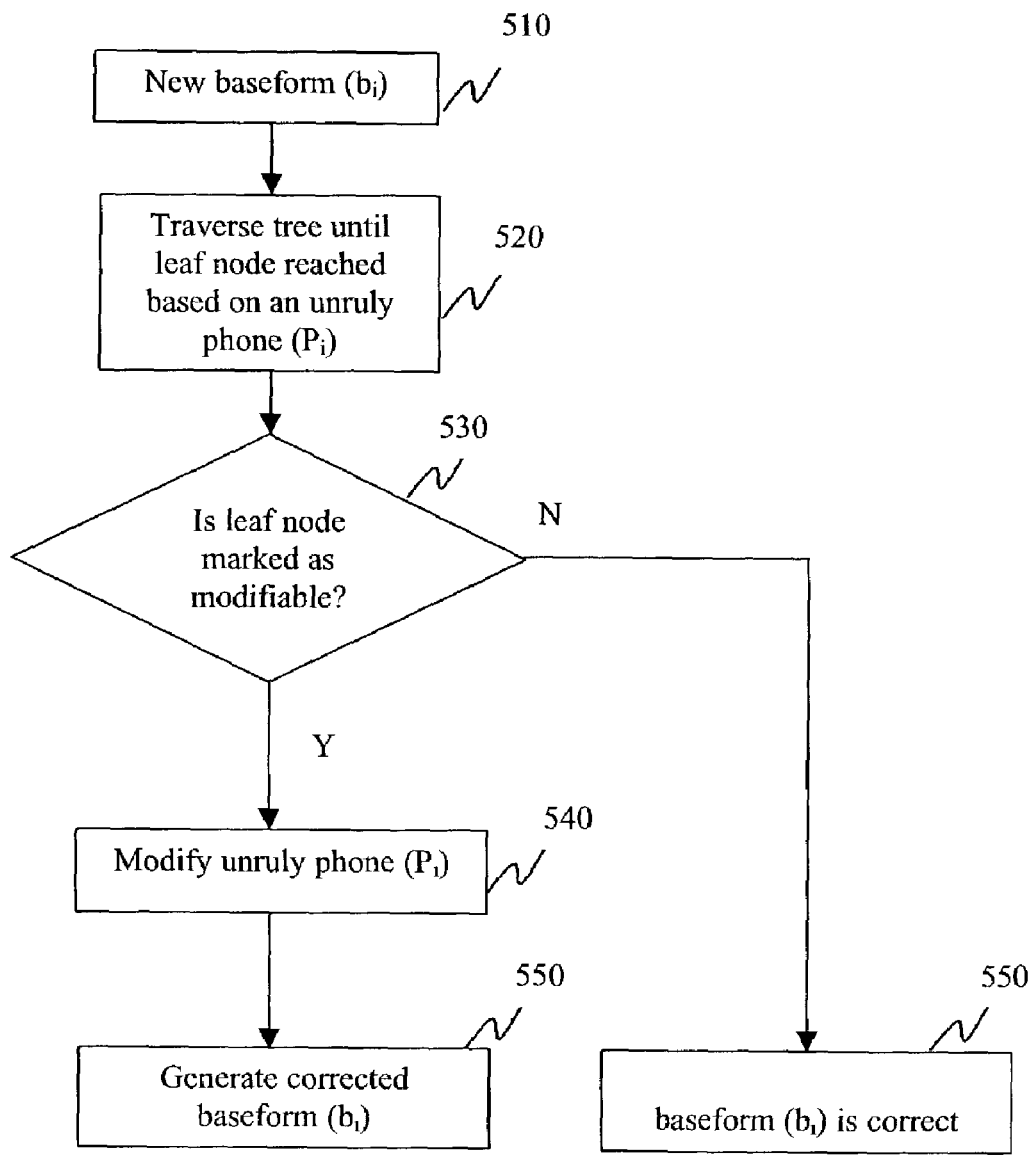
FIG. 5 is a flow diagram of a method for baseform correction using decision trees.

FIG. 5 shows a flow diagram of a method for baseform correction using decision trees.

When a new baseform is presented to the system, at step 510, the tree is traversed, at step 520, based on the context of an unruly phone in the baseform, until a leaf node is reached.

Each leaf node is either marked as modifiable or as unmodifiable. If the leaf reached by traversing the tree is marked modifiable (Y), at step 530, then the unruly phone for which the tree was traversed is modified, at step 540, and the correct baseform is generated, at step 550. Modifications in the baseform depend on the nature of the unruly phone. Depending on the nature of the unruly phone, the phone can be deleted to correct the baseform, or the phone can be replaced by another phone, or, the alternate baseform can be deleted (as described hereinbefore). On the other hand, if the leaf reached has been marked as unmodifiable (N), at step 530, the baseform is diagnosed as correct by the decision tree, at step 550, and is left unchanged.

Computer Hardware and Software

Figure 6:
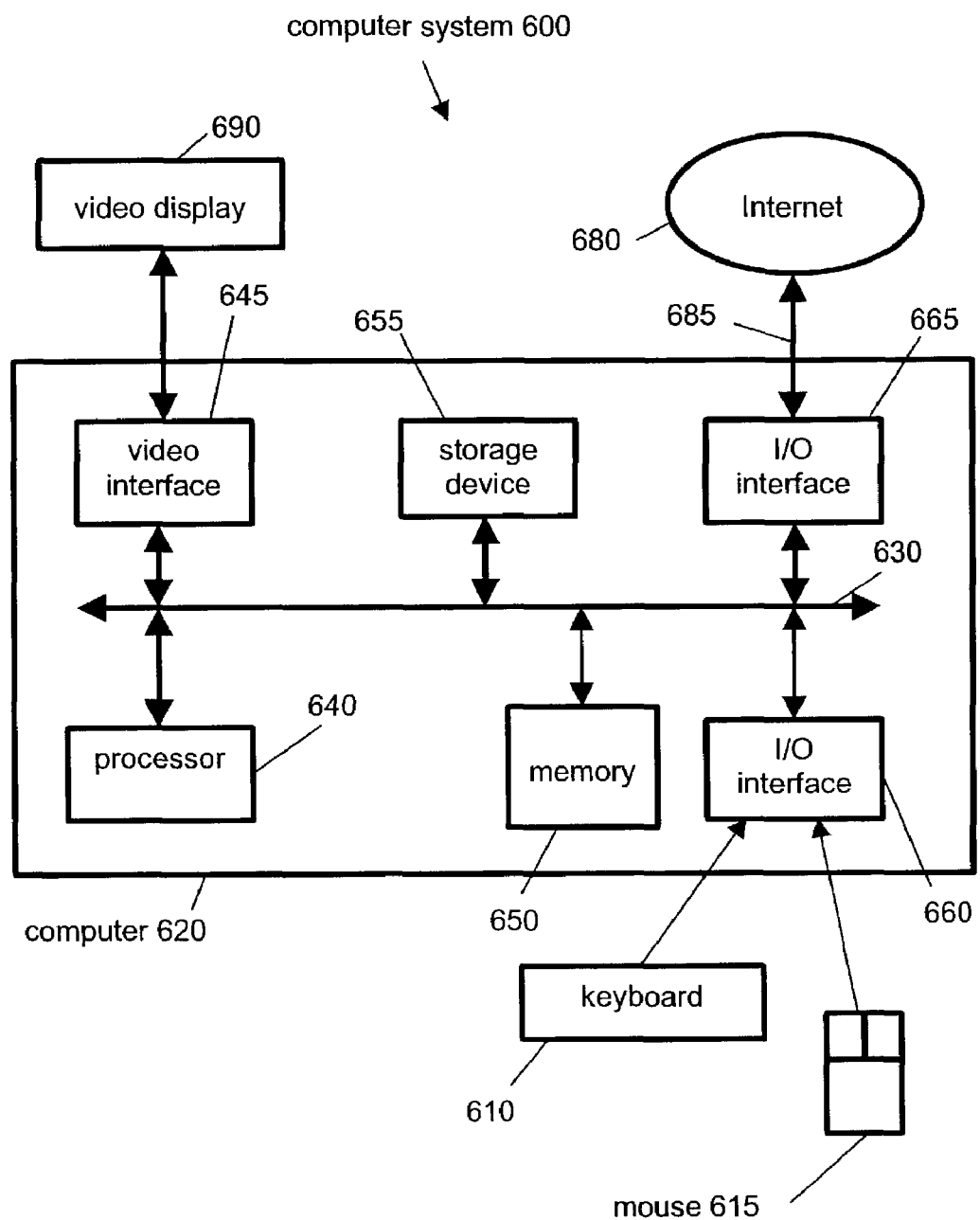
FIG. 6 is a schematic representation of a computer system suitable for performing the methods or techniques described with reference to FIGS. 1 to 5.

FIG. 6 is a schematic representation of a computer system 600 that can be used to perform steps in a process that implement the techniques described herein. The computer system 600 is provided for executing computer software that is programmed to assist in performing the described techniques. This computer software executes under a suitable operating system installed on the computer system 600.

The computer software involves a set of programmed logic instructions that are able to be interpreted by the computer system 600 for instructing the computer system 600 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 600 include: a computer 620, input devices 610, 615 and video display 690. The computer 620 includes: processor 640, memory module 650, input/output (I/O) interfaces 660, 665, video interface 645, and storage device 655.

The processor 640 is a central processing unit (CPU) that executes the operating system and the computer software executing under the operating system. The memory module 650 includes random access memory (RAM) and read-only memory (ROM), and is used under direction of the processor 640.

The video interface 645 is connected to video display 690 and provides video signals for display on the video display 690. User input to operate the computer 620 is provided from input devices 610, 615 consisting of keyboard 610 and mouse 615. The storage device 655 can include a disk drive or any other suitable non-volatile storage medium.

Each of the components of the computer 620 is connected to a bus 630 that includes data, address, and control buses, to allow these components to communicate with each other via the bus 630.

The computer system 600 can be connected to one or more other similar computers via a input/output (I/O) interface 665 using a communication channel 685 to a network 680, represented as the Internet.

The computer software program may be provided as a computer program product, and recorded on a portable storage medium. In this case, the computer software program is accessed by the computer system 600 from the storage device 655. Alternatively, the computer software can be accessed directly from the network 680 by the computer 620. In either case, a user can interact with the computer system 600 using the keyboard 610 and mouse 615 to operate the programmed computer software executing on the computer 620.

The computer system 600 is described for illustrative purposes: other configurations or types of computer systems can be equally well used to implement the described techniques. The foregoing is only an example of a particular type of computer system suitable for implementing the described techniques.

CONCLUSION

A method, a computer system and a computer software product have been described for automatically generating baseforms from the spelling of input text. Various alterations and modifications can be made to the techniques and arrangements described herein, as would be apparent to one skilled in the relevant art in the light of this disclosure, without departing from the spirit and scope of the invention.

We claim:

1. A method for generating baseforms or phonetic spellings front input text, said method comprising:
generating baseforms from said input text using said defined rules for a language;
identifying specific phones, in said language, that are exceptions to said defined rules;
associating actions with said specific phones, wherein each specific phone is associated with only one action that is defined to correct any of said baseforms that contain said specific phone;
identifying each of said baseforms that contain any of said specific phones;
for each of said baseforms that contain said specific phones, applying a statistical technique to determine whether said specific phones can be modified, wherein said statistical technique is applied solely to baseforms containing said specific phones that are exceptions to said defined rules; and
automatically correcting said baseforms containing said specific phones that can be modified by performing said actions that were associated with said specific phones.

2. A method according to claim 1, wherein said defined rules comprise spelling-to-sound rules for a particular phonetic language.

3. A method according to claim 1, wherein all possible alternative pronunciations of each baseform are incorporated in said defined rules.

4. A method according to claim 1, wherein said language comprises Hindi.

5. A method according to claim 1 further comprising applying said statistical technique to reduce a number of alternative baseforms to generate a reduced size pronunciation dictionary.

6. A method according to claim 5, wherein said reduced size pronunciation dictionary is generated by performing only one of one of the following for each one of said specific phones:
removing a phone from a baseform;
replacing a phone by another phone; and
deleting a baseform.

7. A method according to claim 1, wherein said statistical technique uses information relating to the context of a phone in a baseform.

8. A method according to claim 1, wherein for each one of said specific phones said action comprises only one of:
removing a phone from a baseform;
replacing a phone by another phone; and
deleting a baseform.

9. A computer system for generating baseforms or phonetic spellings from input text, said computer system comprising:
a processor means for defining rules for generating a pronunciation dictionary for a particular language;
a processor means for generating baseforms from said input text using said defined rules;
a processor means for identifying specific phones, in said language, that are exceptions to said defined rules;
a processor means for associating actions with said specific phones, wherein each specific phone is associated with only one action that is defined to correct any baseforms that contain said specific phone;
a processor means for identifying each of said baseforms that contain any of said specific phones;
a processor means for applying a statistical technique to each of said baseforms that contain said specific phones in order to determine whether said specific phones can be modified, wherein said statistical technique is applied solely to baseforms containing said specific phones that are exceptions to said defined rules; and
a processor means for automatically correcting said baseforms containing said specific phones that can be modified by performing said actions that were associated with said specific phone.

10. A computer system according to claim 9, wherein said defined rules comprise spelling-to-sound rules for a particular phonetic language.

11. A computer system according to claim 9, wherein all possible alternative pronunciations of each baseform are incorporated in said defined rules.

12. A computer system according to claim 9, wherein said language comprises Hindi.

13. A computer system according to claim 9, further comprising a processor means for applying said statistical technique to reduce a number of alternative baseforms to generate a reduced size pronunciation dictionary.

14. A computer system according to claim 13, further comprising a processor means for generating said reduced size pronunciation dictionary, said processor means for generating said reduced size pronunciation dictionary comprising at least one of:
a processor means for removing a phone from a baseform;
a processor means for replacing a phone by another phone; and
a processor means for deleting a baseform.

15. A computer system according to claim 9, wherein said statistical technique uses information relating to the context of a phone in a baseform.

16. A computer system according to claim 9, wherein for each one of said specific phones said action comprises only one of:
removing a phone from a baseform;
replacing a phone by another phone; and
deleting a baseform.

17. A computer program product having a computer readable medium having a computer program recorded therein for generating baseforms or phonetic spellings from input text, said computer program product comprising:

a computer program code means for defining rules for generating a pronunciation dictionary for a particular language;

a computer program code means for generating baseforms from said input text using said defined rules;

a computer program code means far identifying specific phones, in said language, that are exceptions to said defined rules;

a computer program code means for associating actions with said specific phones, wherein each specific phone is associated with only one action that is defined to correct any baseforms that contain said specific phone;

a computer program code means for identifying each of said baseforms that contain any of said specific phones;

a computer program code means for applying a statistical technique to each of said baseforms that contain said specific phones in order to determine whether said specific phones can be modified, wherein said statistical technique is applied solely to base forms containing said specific phones that are exceptions to said defined rules; and a computer program code means for automatically correcting said baseforms containing said specific phones that can be modified by performing said actions that were associated with said specific phones.

18. A computer program product according to claim 17, wherein said defined rules comprise spelling-to-sound rules for a particular phonetic language.

19. A computer program product according to claim 17, wherein all possible alternative pronunciations of each baseform are incorporated in said defined rules.

20. A computer program product according to claim 17, wherein said language comprises Hindi.

21. A computer program product according to claim 17, further comprising a computer program code means for applying said statistical technique to reduce a number of alternative baseforms to generate a reduced size pronunciation dictionary.

22. A computer program product according to claim 21, further including processor means for generating said reduced size pronunciation dictionary, said computer program code means comprising at least one of:

a computer program code means for removing a phone from a baseform;

a computer program code means for replacing a phone by another phone; and a computer program code means for deleting a baseform.

23. A computer program product according to claim 17, wherein said statistical technique uses information relating to the context of a phone in a baseform.

24. A computer program product according to claim 17, wherein for each one of said specific phones said action comprises only one of:

removing a phone from a baseform;

replacing a phone by another phone; and deleting a baseform.

25. A computer program product having a computer readable medium having a computer program recorded therein for generating baseforms or phonetic spellings from input text, said computer program product including:

a pronunciation dictionary for a particular language;

a list of actions associated with specific phones that are exceptions to rules defined for said language, wherein each specific phone is associated with only one action that is defined to correct any baseforms that contain said specific phone;

a computer program code means for generating baseforms from said input text according to said defined rules;

a computer program code means for identifying baseforms that contain any of said specific phones that are exceptions to said defined rules;

a computer program code means for applying a statistical technique to each of said baseforms that contain said specific phones in order to determine whether said specific phones can be modified, wherein said statistical technique is applied solely to baseforms containing said specific phones that are exceptions to said defined rules; and computer program code means for automatically correcting said baseforms containing said specific phones that should can be modified by performing said actions that are associated with said specific phones.

26. A computer program product according to claim 25, wherein said statistical technique uses information relating to the context of a phone in a baseform.

27. A computer program product according to claim 25, wherein for each of said specific phones said action comprises only one of:

removing a phone from a baseform;

replacing a phone by another phone; and deleting a baseform.

28. A computer program product according to claim 25, wherein said defined rules comprise spelling-to-sound rules for a particular phonetic language.

29. A computer program product according to claim 25, wherein said language comprises Hindi.

* * * * *